(12) United States Patent
Teeters

(10) Patent No.: US 10,828,676 B2
(45) Date of Patent: Nov. 10, 2020

(54) CORD CLEANING DEVICE AND METHOD OF USING SAME

(71) Applicant: Dandy Products, LLC, Statesville, NC (US)

(72) Inventor: Kenneth W. Teeters, Mooresville, NC (US)

(73) Assignee: Dandy Products, LLC, Statesville, NC (US)

( * ) Notice: Subject to any disclaimer, the term of this patent is extended or adjusted under 35 U.S.C. 154(b) by 32 days.

(21) Appl. No.: 16/382,987

(22) Filed: Apr. 12, 2019

(65) Prior Publication Data

US 2020/0324322 A1    Oct. 15, 2020

(51) Int. Cl.
  *B08B 1/02*    (2006.01)
  *B65G 45/14*    (2006.01)
  *B08B 17/04*    (2006.01)

(52) U.S. Cl.
  CPC ............ *B08B 1/02* (2013.01); *B08B 17/04* (2013.01); *B65G 45/14* (2013.01)

(58) Field of Classification Search
  CPC ............ B08B 1/02; B08B 17/04; B65G 45/14
  See application file for complete search history.

(56) References Cited

U.S. PATENT DOCUMENTS

| 1,931,887 | A | * | 10/1933 | Bocker | D06F 53/005 |
| | | | | | 15/256.6 |
| 5,784,752 | A | * | 7/1998 | Barrett | B08B 1/02 |
| | | | | | 15/256.6 |
| 5,791,011 | A | * | 8/1998 | Richter | B66B 7/1284 |
| | | | | | 15/231 |
| 2005/0217058 | A1 | * | 10/2005 | Connolly | B08B 1/008 |
| | | | | | 15/256.6 |

FOREIGN PATENT DOCUMENTS

CA    2421130 A1 *    9/2004    ............... B08B 1/02

* cited by examiner

*Primary Examiner* — Marc Carlson
(74) *Attorney, Agent, or Firm* — Ashley Law Firm P.C.; Stephen S. Ashley, Jr.

(57) ABSTRACT

A device for cleaning cords, cables, lines, strings, wires, ropes, and the like includes first and second angled sections. The angled sections can be substantially perpendicular to each other. The first section can include substantially parallel panels, and a substantially U-shaped opening can be formed in each panel. The openings are partially aligned with each other such that the cord, cable, line, string, wire or rope can be positioned therethrough. The device can be used to clean feeder/drinker lines in poultry houses.

20 Claims, 18 Drawing Sheets

CORD CLEANING DEVICE AND METHOD OF USING SAME

CROSS REFERENCE TO RELATED APPLICATIONS

This application claims priority to U.S. Provisional Patent Application No. 62/658,170, filed Apr. 16, 2018, which is incorporated herein by reference.

TECHNICAL FIELD

The present invention relates to the mechanical arts. An embodiment of the invention comprises a device for cleaning cords, cables, lines, strings, wires, ropes, and the like. Another embodiment of the invention comprises a method for cleaning feeder/drinker lines in poultry houses.

BACKGROUND

In commercial poultry houses, birds typically feed and drink from containers of food and water that can be lowered and raised from the ground via cords or cables that are attached to the food/water containers and operatively connected to pulleys. These cords and cables can be referred to as feeder/drinker cords or cables. While in use in a poultry house, large amounts of dirt, dust and other debris typically collect on the feeder/drinker cords. When the feeder/drinker cords move through the pulleys, the dirt and debris on the feeder/drinker cords collects in the pulleys. Cleaning the pulleys via traditional methods can be difficult and cumbersome, particularly when there are birds in the poultry house.

SUMMARY

Accordingly, an object of the present invention is to provide a device that can help maintain poultry house feeder/drinker cords and pulleys in a clean condition. This and other objectives of the invention can be achieved in various embodiments of the invention described herein.

One embodiment of the invention comprises a method for cleaning feeder/drinker cords and cables in poultry houses.

Another embodiment of the invention comprises an apparatus for cleaning a linear member, such as a cord, cable, line, string, wire, rope, and the like. The apparatus comprises a first section connected to a second section, the first section angled in relation to the second section and comprising a first panel and a second panel. The first panel defines a first edge and a second edge opposed to the first edge, and the second panel defines a first edge and a second edge opposed to the first edge. The first edge of the first panel is proximate to the first edge of the second panel, and the second edge of the first panel is proximate to the second edge of the second panel. At least one opening is formed in the first panel and is in communication with the first edge of the first panel. At least one opening is formed in the second panel and is in communication with the second edge of the second panel. The opening in the first panel is at least partially aligned with the opening in the second panel, and together the two openings form an enclosure for receiving the linear member therethrough, and the first panel and the second panel frictionally engage the linear member.

According to an embodiment of the invention, the second section defines a first edge and a second edge opposed to the first edge, and the first edge of the second section is co-planar with the first edge of the first panel of the first section. An opening adapted for receiving and retaining the linear member is formed in the second section and is in communication with the first edge of the second section.

According to another embodiment of the invention, the opening formed in the second section is comprised of a channel portion extending at an angle from the first edge of the second section to a circular portion.

According to another embodiment of the invention, the circular portion has a diameter that is greater than a width of the channel portion.

According to another embodiment of the invention, the first section is substantially perpendicular to the second section.

According to another embodiment of the invention, the first panel has first and second openings, and the second panel has first and second openings, wherein the first panel's first opening is at least partially aligned with the second panel's first opening, and the first panel's second opening is at least partially aligned with the second panel's second opening.

According to another embodiment of the invention, the width of the second panel's first opening is greater than the width of the second panel's second opening.

Another embodiment of the invention comprises an apparatus for cleaning a linear member operatively connected to a pulley. The apparatus comprises a first section connected to a second section, the first section being substantially perpendicular to the second section. The first section comprises a first panel and a second panel, wherein the first panel defines a first edge and a second edge opposed to the first edge. The second panel defines a first edge and a second edge opposed to the first edge. The first edge of the first panel is proximate to the first edge of the second panel, and the second edge of the first panel is proximate to the second edge of the second panel. At least one opening is formed in the first panel and is in communication with the first edge of the first panel. At least one opening is formed in the second panel and is in communication with the second edge of the second panel. The first panel opening is at least partially aligned with the second panel opening, and together the openings form an enclosure for receiving the linear member therethrough whereby the first panel and the second panel frictionally engage the linear member. The second section defines a first edge and a second edge opposed to the first edge. The first edge of the second section is co-planar with the first edge of the first panel of the first section. An opening for receiving and retaining the linear member is formed in the second section and is in communication with the first edge of the second section.

According to another embodiment of the invention, the opening formed in the second section comprises a channel portion extending at an angle from the first edge of the second section to a circular portion.

According to another embodiment of the invention, the circular portion has a diameter that is greater than a width of the channel portion.

According to an embodiment of the invention, the linear member can be a cord, cable, line, string, wire, or rope.

According to another embodiment of the invention, the first panel has first and second openings, and the second panel has first and second openings. The first panel first opening is at least partially aligned with the second panel first opening, and the first panel second opening is at least partially aligned with the second panel second opening.

According to another embodiment of the invention, the width of the second panel's first opening is greater than the width of the second panel's second opening.

According to another embodiment of the invention, the second panel's first opening has a width of ¼ inch, and the second panel's second opening has a width of 3/16 inch.

Another embodiment of the invention comprises a method of cleaning a linear member operatively connected to a pulley. The method comprises providing an apparatus comprising a first section connected to a second section, in which the first section is substantially perpendicular to the second section. The first section comprises a first panel and a second panel, wherein the first panel defines a first edge and a second edge opposed to the first edge. The second panel defines a first edge and a second edge opposed to the first edge. The first edge of the first panel is proximate to the first edge of the second panel and the second edge of the first panel is proximate to the second edge of the second panel. At least one opening is formed in the first panel and is in communication with the first edge of the first panel. At least one opening is formed in the second panel and is in communication with the second edge of the second panel. The first panel's opening is at least partially aligned with the second panel's opening. The first panel's opening and the second panel's opening together form an enclosure for receiving the linear member therethrough. The second section defines a first edge and a second edge opposed to the first edge. The first edge of the second section is co-planar with the first edge of the first panel of the first section, and an opening adapted for receiving and retaining the linear member is formed in the second section and is in communication with the first edge of the second section. A portion of the linear member that is prior to entering the pulley is positioned within the enclosure formed by first panel opening and the second panel opening. Another portion of the linear member that has exited the pulley is positioned within the opening formed in the second section. The linear member is moved through the pulley, and debris on the linear member is scrapped off of the linear member by the first panel and the second panel of the first section.

According to another embodiment of the invention, the opening formed in the second section is comprised of a channel portion and a circular portion. The channel portion extends at an angle from the first edge of the second section to the circular portion. The diameter of the circular portion is greater than the width of the channel portion.

Another embodiment of the invention comprises a kit comprising a pulley, a linear member, such as a cord, cable, line, string, wire, or rope, adapted to be operatively connected to the pulley, and an apparatus adapted for cleaning the linear member. The cleaning apparatus comprises a first section connected to a second section, the first section being substantially perpendicular to the second section. The first section comprises a first panel and a second panel, wherein the first panel defines a first edge and a second edge opposed to the first edge. The second panel defines a first edge and a second edge opposed to the first edge. The first edge of the first panel is proximate to the first edge of the second panel, and the second edge of the first panel is proximate to the second edge of the second panel. At least one opening is formed in the first panel and is in communication with the first edge of the first panel. At least one opening is formed in the second panel and is in communication with the second edge of the second panel. The first panel opening is at least partially aligned with the second panel opening, and together the openings form an enclosure for receiving the linear member therethrough whereby the first panel and the second panel frictionally engage the linear member. The second section defines a first edge and a second edge opposed to the first edge. The first edge of the second section is co-planar with the first edge of the first panel of the first section. An opening for receiving and retaining the linear member is formed in the second section and is in communication with the first edge of the second section.

DETAILED DESCRIPTION OF PREFERRED EMBODIMENTS

Figure 1:
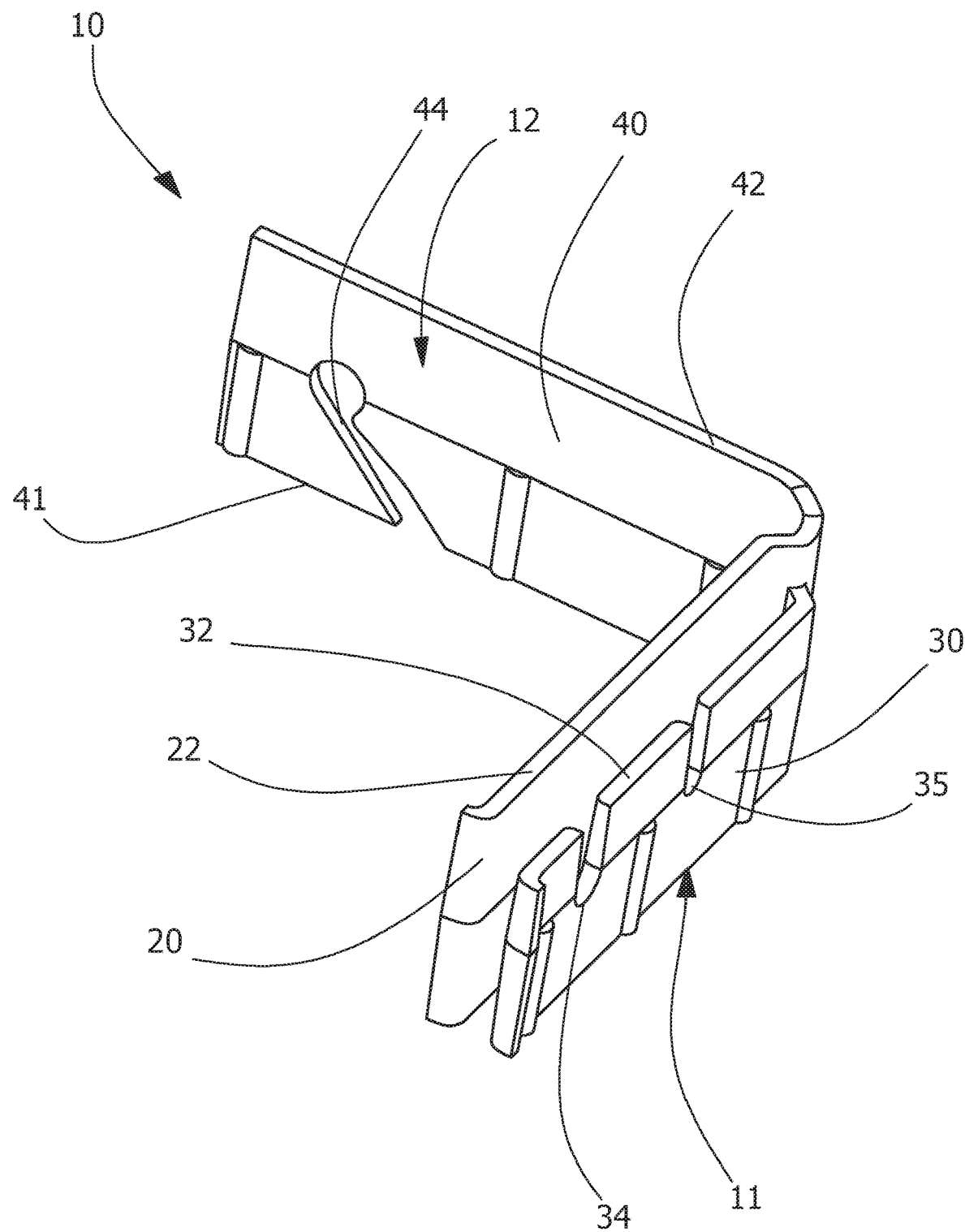
FIG. 1 is a perspective view of a cord cleaning device according to a preferred embodiment of the invention.
Figure 7:
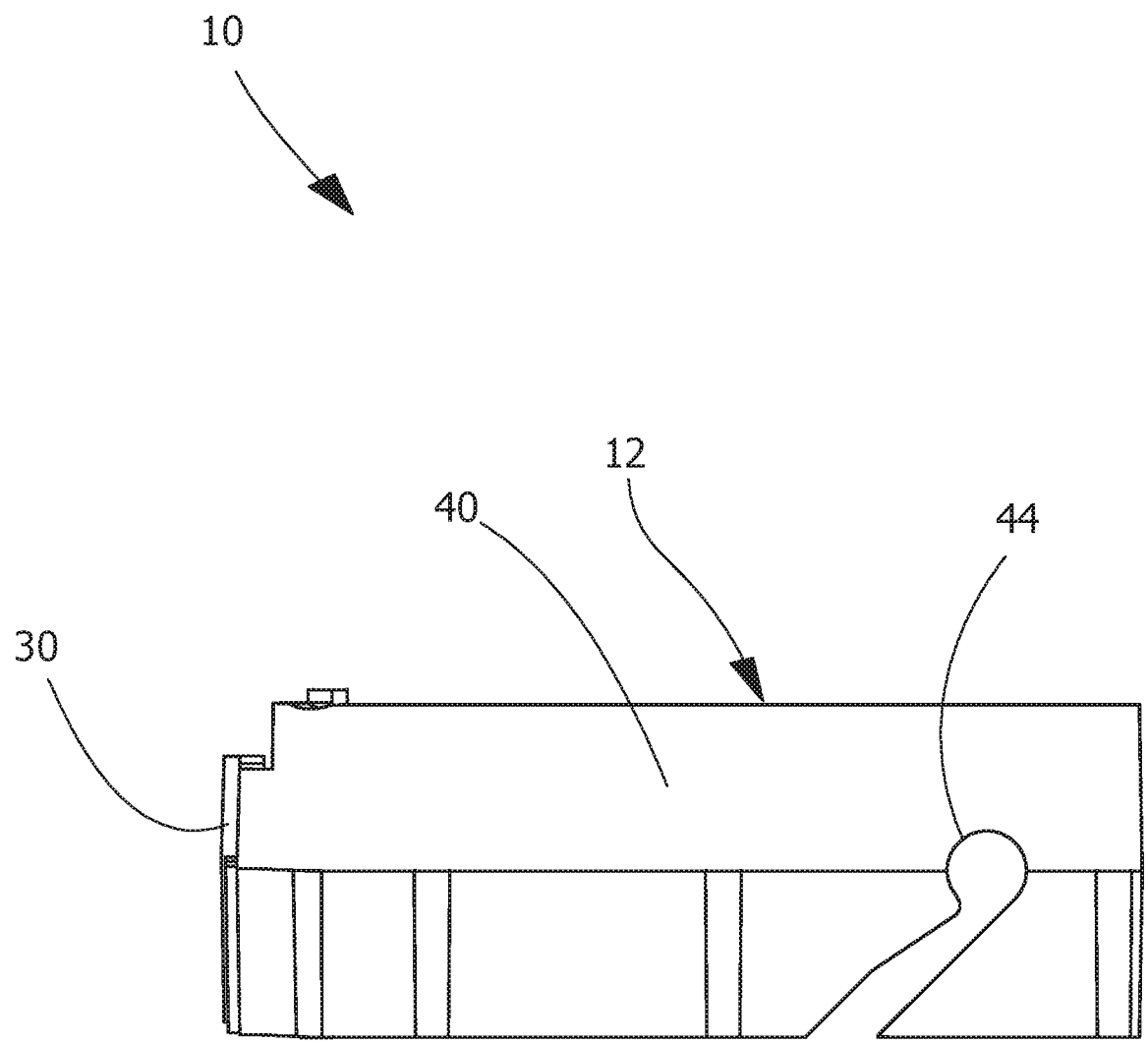
FIG. 7 is a side elevation of the device of FIG. 1.
Figure 8:
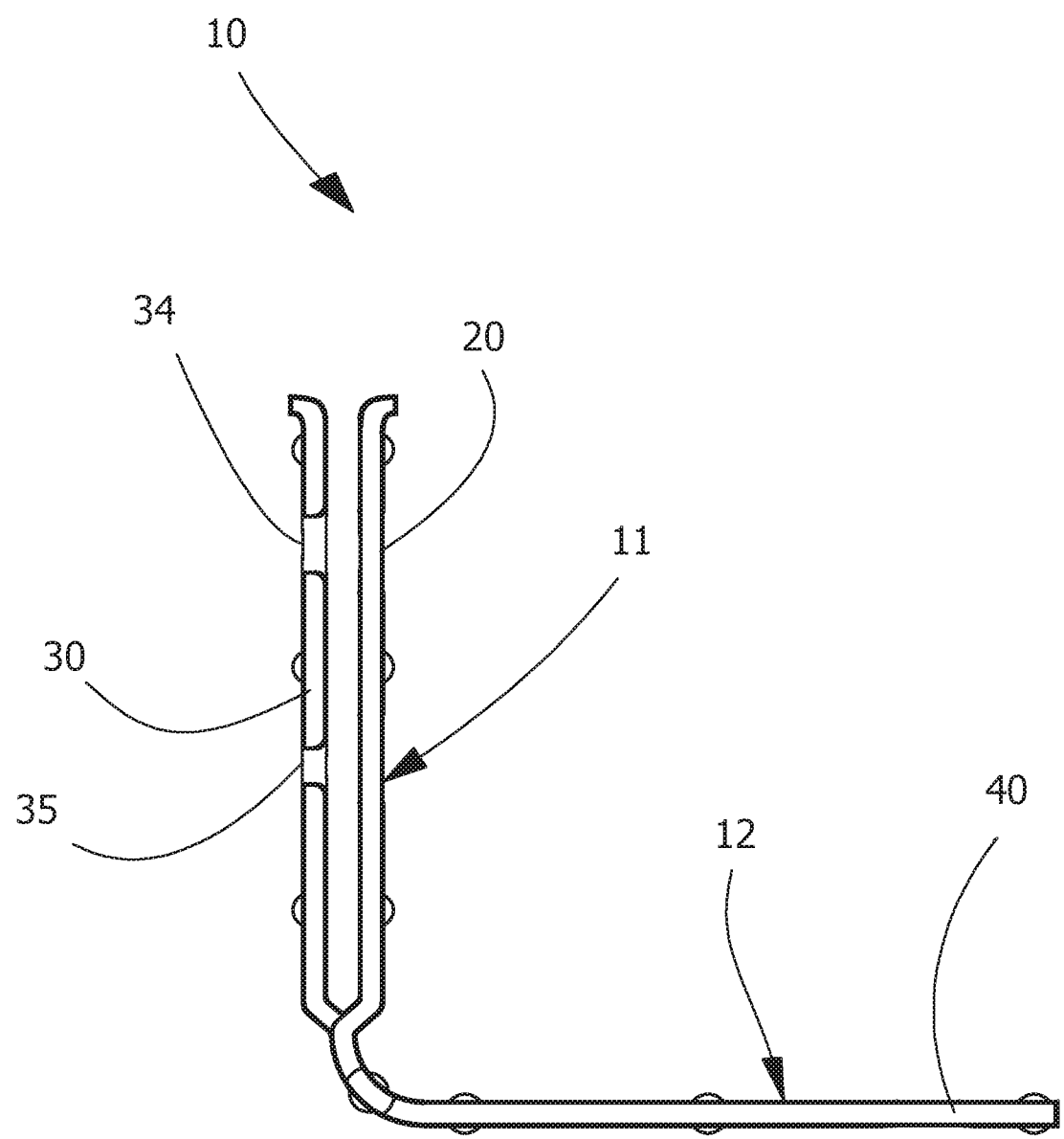
FIG. 8 is a bottom plan view of the device of FIG. 1.
Figure 9:
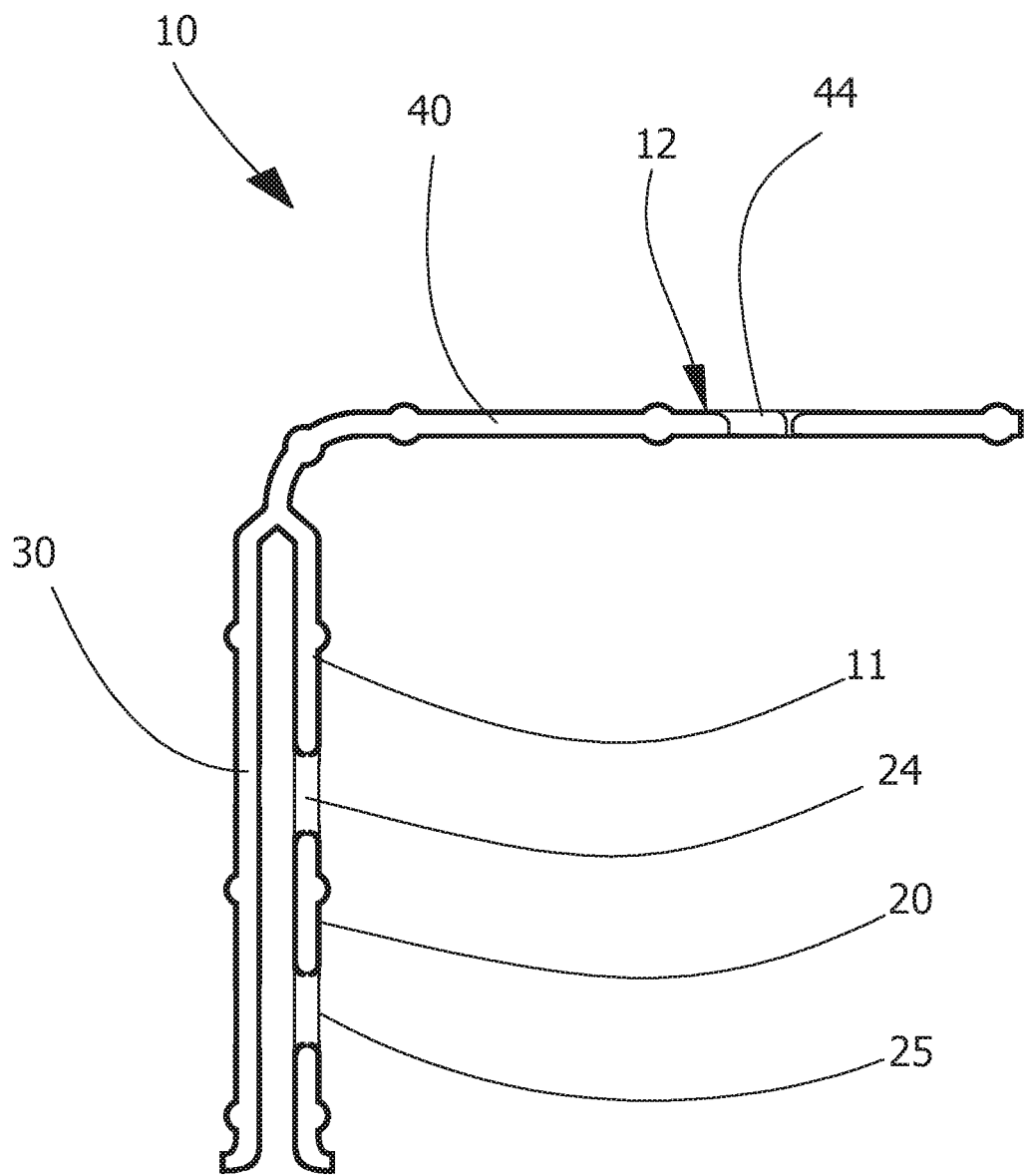
FIG. 9 is a top plan view of the device of FIG. 1.

A cleaning device according to a preferred embodiment of the invention is illustrated in FIGS. 1-17 and shown generally at reference numeral 10. The device 10 comprises an angled member comprising first and second sections 11, 12, respectively. Preferably, the first and second sections 11, 12 are substantially perpendicular to each other to form a substantial "L" shape, as shown in FIGS. 1, 8 and 9. The device 10 can be made of plastic or other suitable material. The device 10 can be a single piece made by injection molding or other suitable process.

The first section 11 is comprised of a pair of substantially parallel panels 20, 30 positioned in a substantial "U" shape, as shown in FIGS. 1, 8 and 9. Each of the panels 20, 30 define opposed edges, referenced herein as front and rear edges for ease of reference. The inner panel 20 defines opposed front and rear edges 21, 22, respectively, and the outer panel 30 defines opposed front and rear edges 31, 32, respectively, as shown in FIGS. 1, 2, 8 and 9. A pair of generally U-shaped openings 24, 25 are formed in the inner panel 20, and are in communication with the front edge 21 of the inner panel 20. A pair of generally U-shaped openings 34, 35 are formed in the outer panel 30, and are in communication with the rear edge 32 of the outer panel 30.

Figure 5:
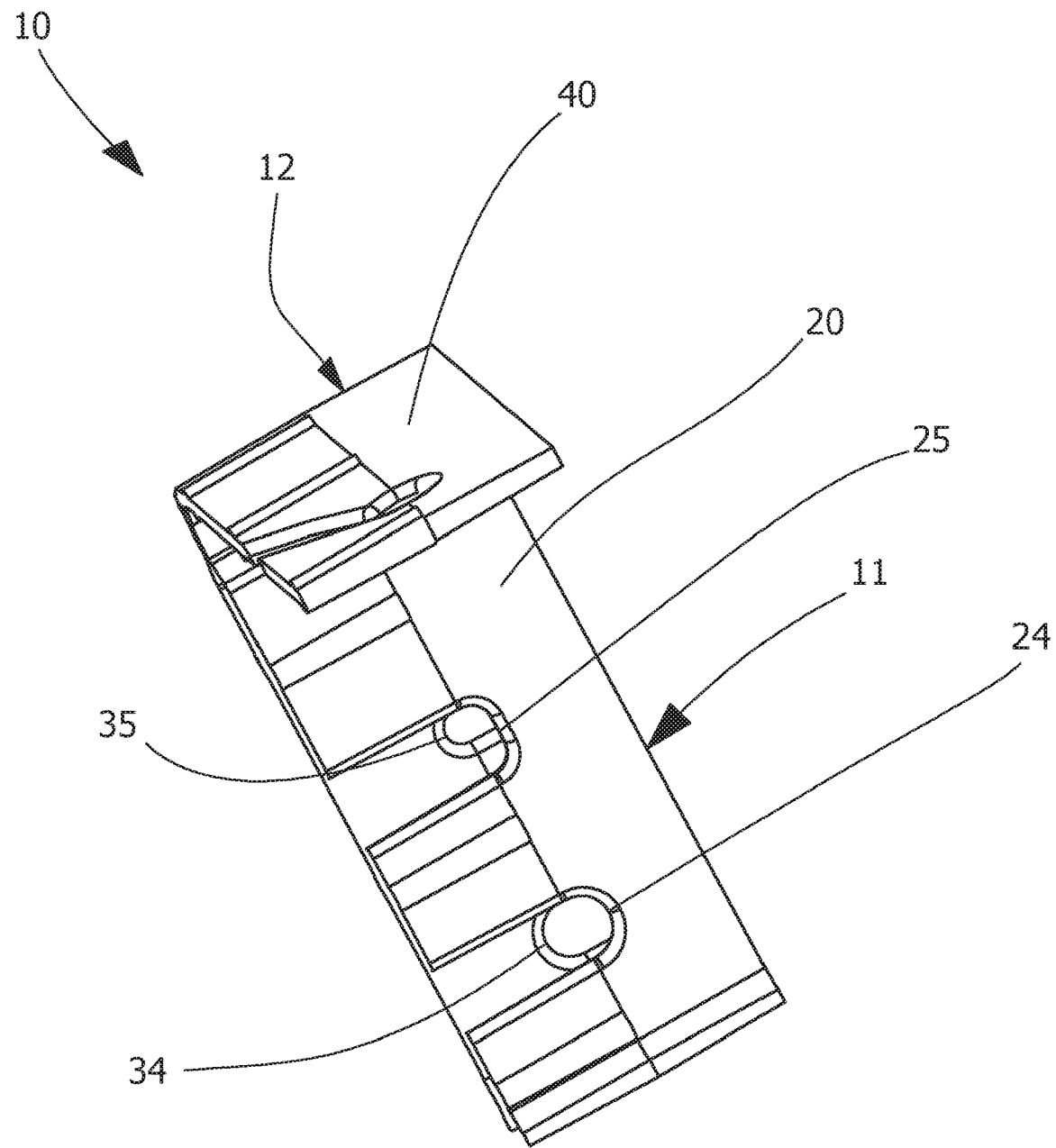
FIG. 5 is another perspective view of the device of FIG. 1.
Figure 6:
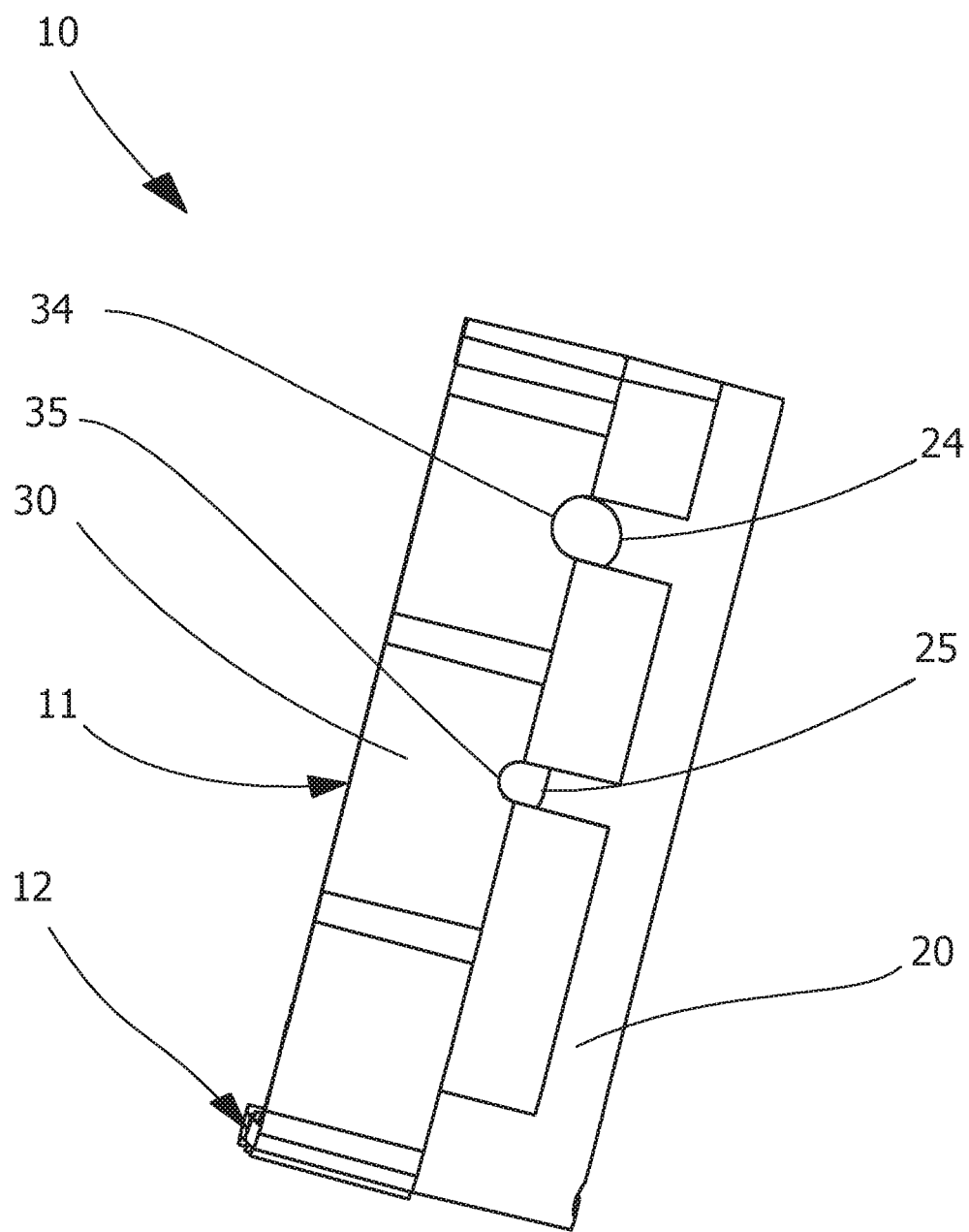
FIG. 6 is another perspective view of the device of FIG. 1.

The first opening 24 of the inner panel 20 is positioned on the inner panel 20 such that at least a portion of the opening 24 is in alignment with a portion of the first opening 34 of the outer panel 30. Likewise, a portion of the second opening 25 of the inner panel 20 is positioned to be aligned with a portion of the second opening 35 of the outer panel 30, as shown in FIGS. 5 and 6. As such, the first opening 24 of the inner panel 20 and the first opening 34 of the outer panel 30 cooperate together to form an enclosed area that can contain a linear member, such as a cord, cable, line, string, wire, rope or the like, therein. Likewise, the second opening 25 of the inner panel 20 and the second opening 35 of the outer panel 30 cooperate together to form an enclosed area that can receive and contain a linear member therein. As used throughout this application, the term "linear member" refers generally to any longitudinal and flexible segment of material, such as a cord, cable, line, string, wire, rope or the like.

The first opening 34 of the outer panel 30 has a width that is larger than the width of the second opening 35 of the outer panel 30. Preferably, the first opening 34 has a width of ¼ inch and the second opening 35 has a width of 3/16 inch.

Figure 2:
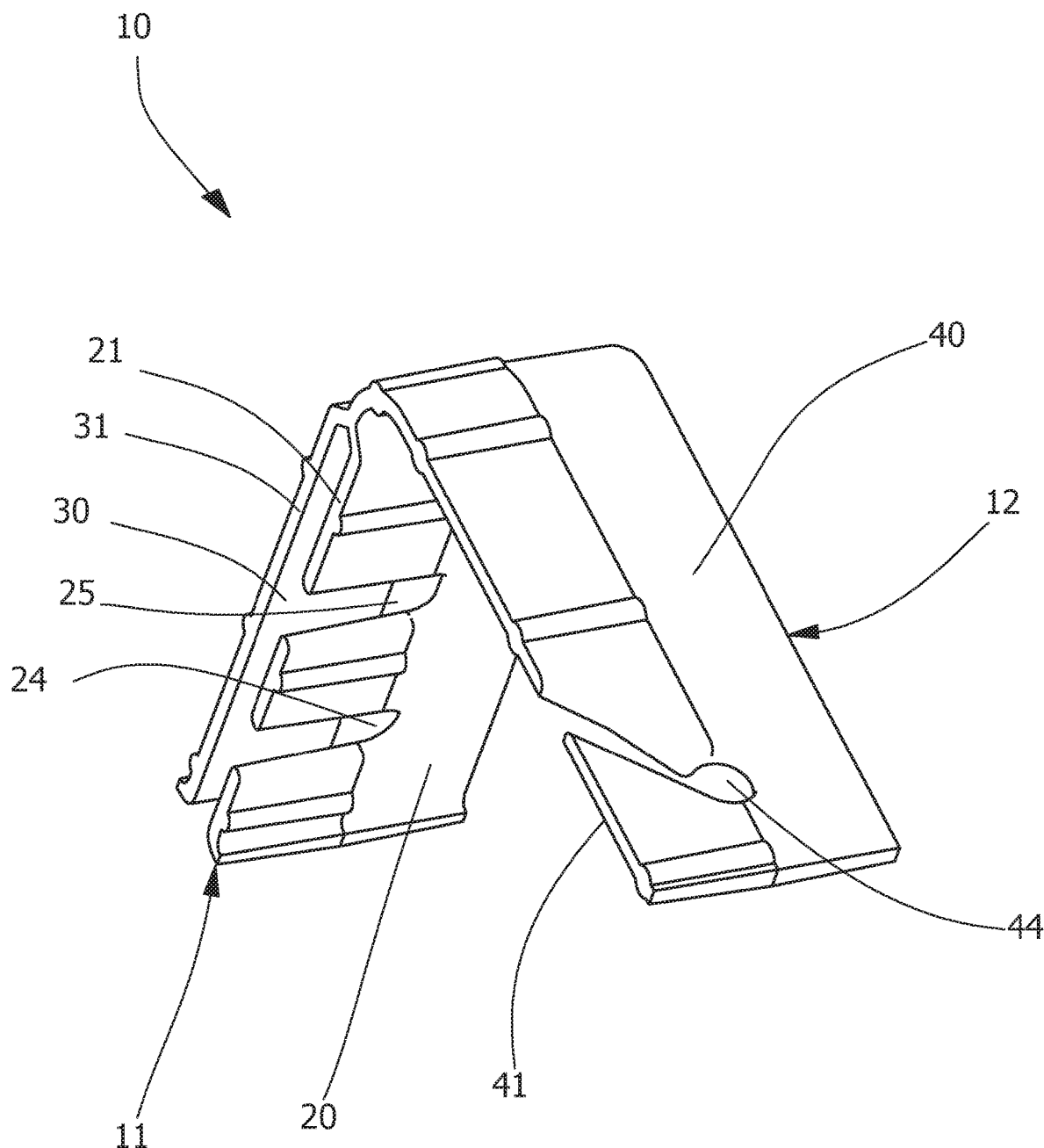
FIG. 2 is another perspective view of the device of FIG. 1.
Figure 3:
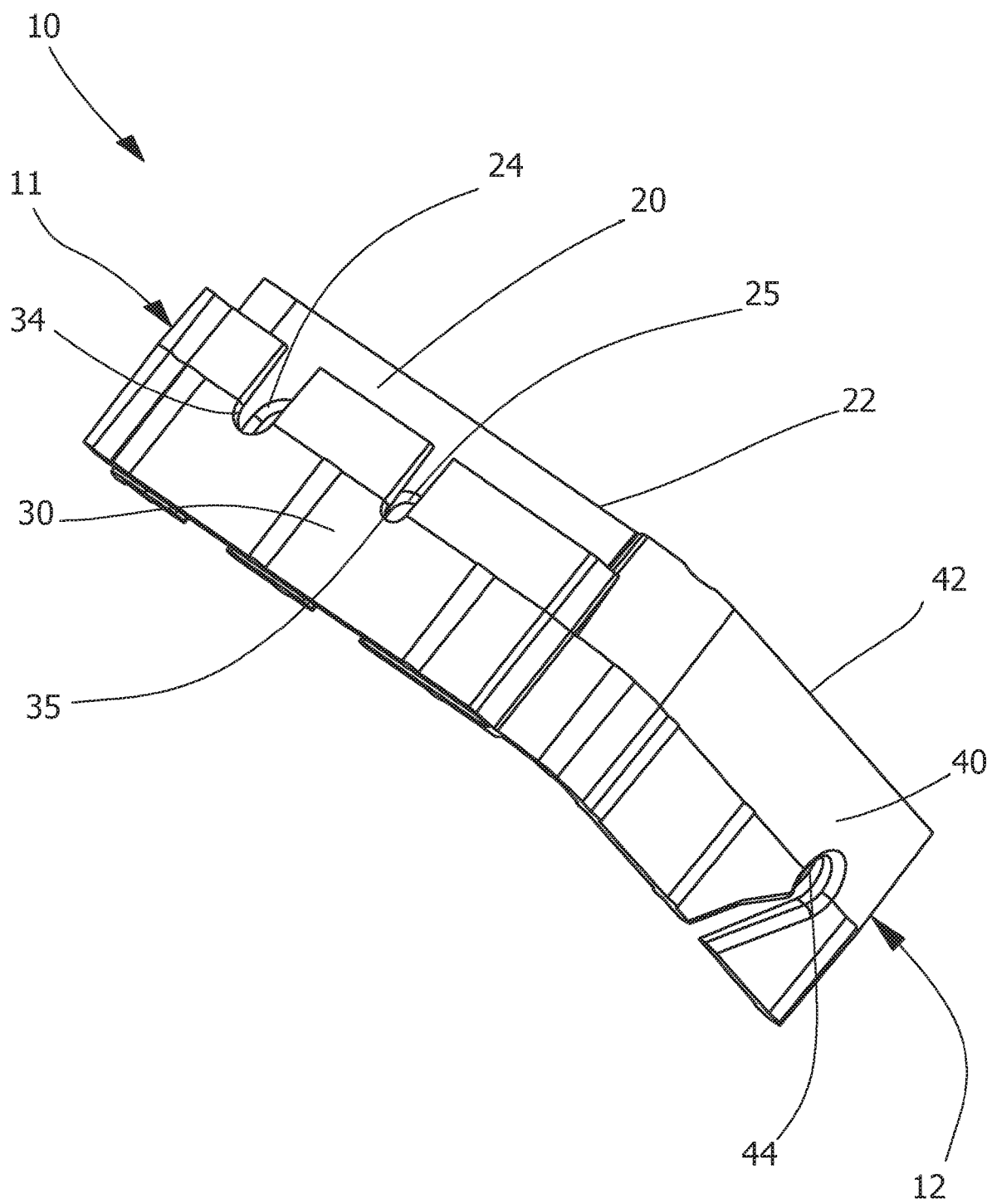
FIG. 3 is another perspective view of the device of FIG. 1.
Figure 4:
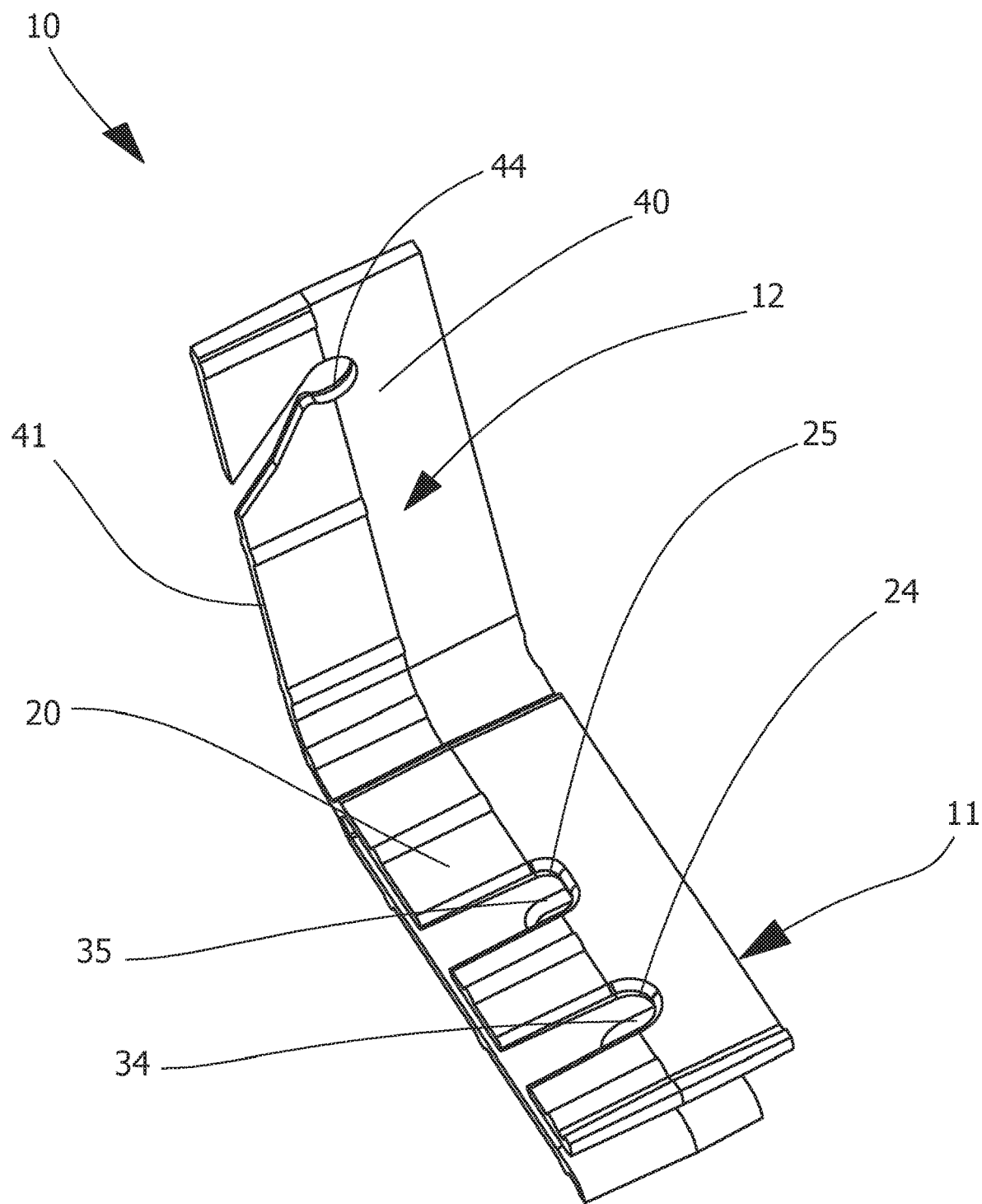
FIG. 4 is another perspective view of the device of FIG. 1.

The second section 12 is comprised of a single panel 40 having a front edge 41 that is co-planar with the front edge 21 of the inner panel 20 of the first section 11, and a rear edge 42 that is co-planar with the rear edge 22 of the inner panel 20, as shown in FIGS. 1 and 2. The second section panel 40 has an opening 44 formed therethrough. As shown in FIGS. 1, 2 and 7, the opening 44 is in communication with the front edge 41. As shown in FIG. 7, the opening 44 has a relatively narrow channel portion extending at an angle from the first edge 41 to a relatively wider circular section.

FIGS. 10-17 illustrate a method of using the device 10 according to a preferred embodiment of the invention. As shown in FIGS. 10-17, the device 10 can be used to clean a feeder/drinker line 60 in a poultry house, and thereby keep the pulley 70 that the line 60 is connected to clean. Preferably, the line 60 is a cord or cable having a diameter of about 3/16 inch.

Figure 10:
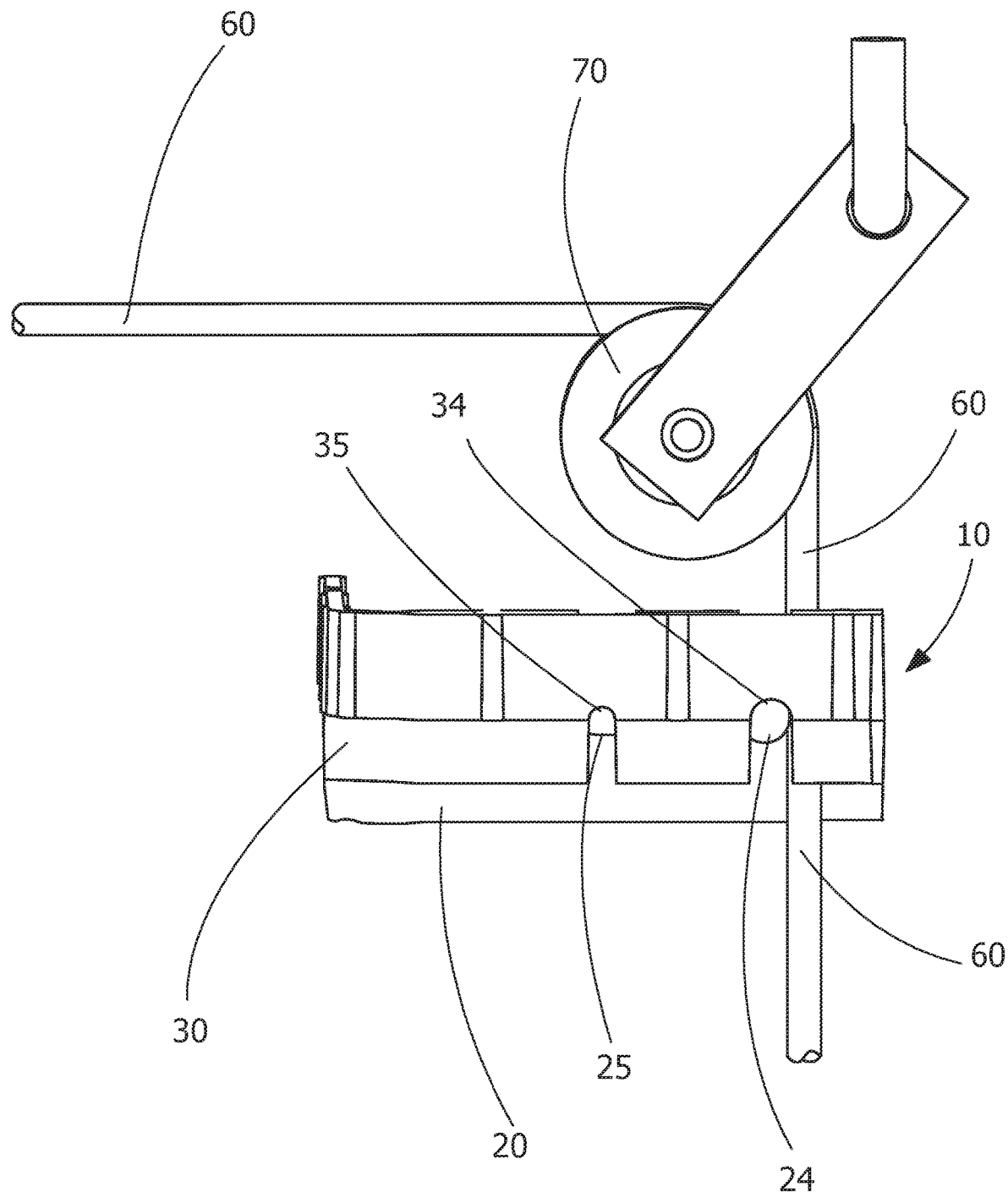
FIG. 10 is an environmental perspective view of the device of FIG. 1.

As shown in FIG. 10, the first section 11 of the device 10 is positioned such that a portion of the feeder/drinker line 60 that is below the pulley 70 is in between the inner panel 20 and the outer panel 30 of the first section 11. The line 60 is positioned within the first opening 24 of the inner panel 20 and the first opening 34 of the outer panel 30, as shown in FIGS. 11-13.

Figure 11:
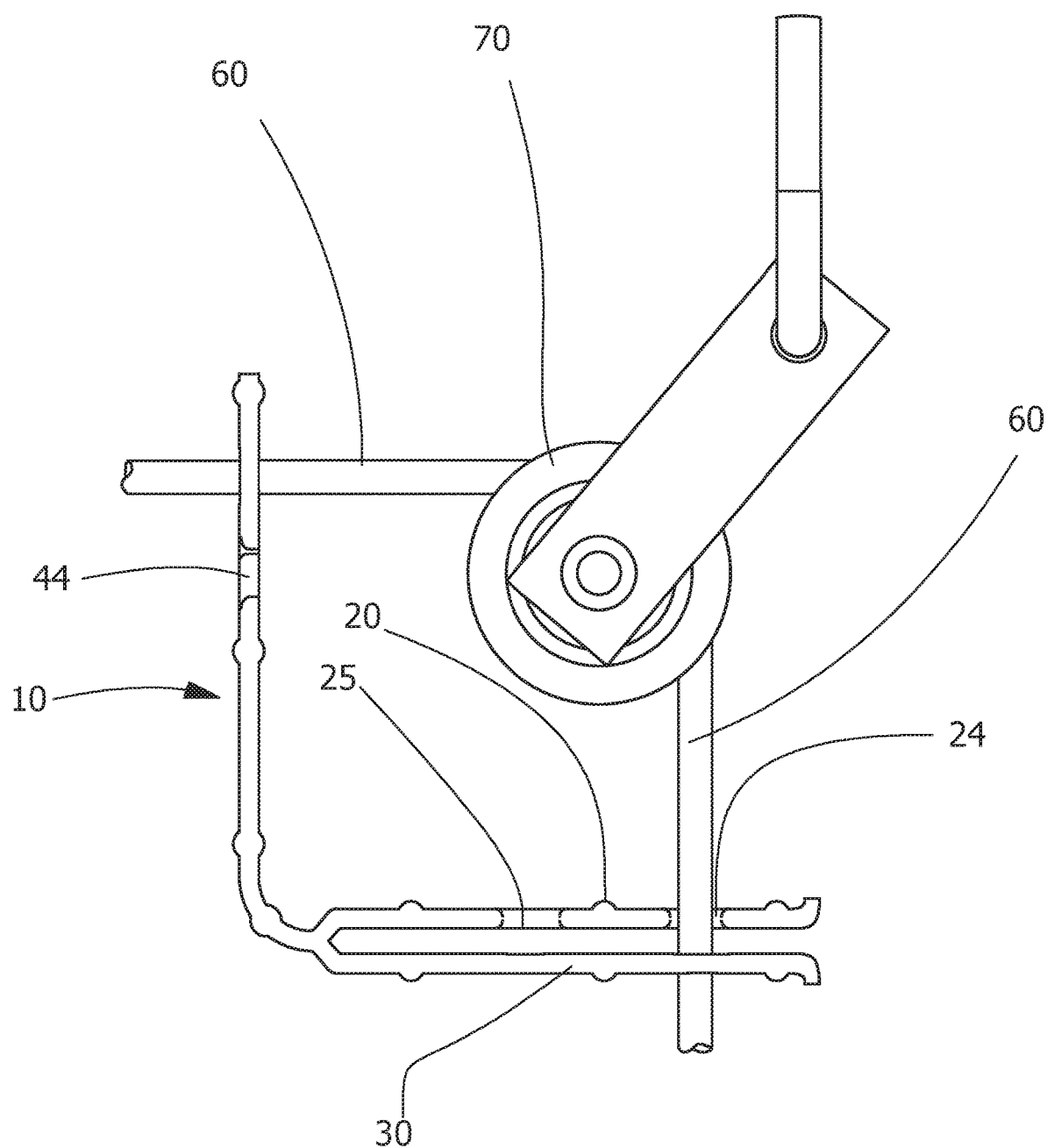
FIG. 11 is another environmental perspective view of the device of FIG. 1.
Figure 12:
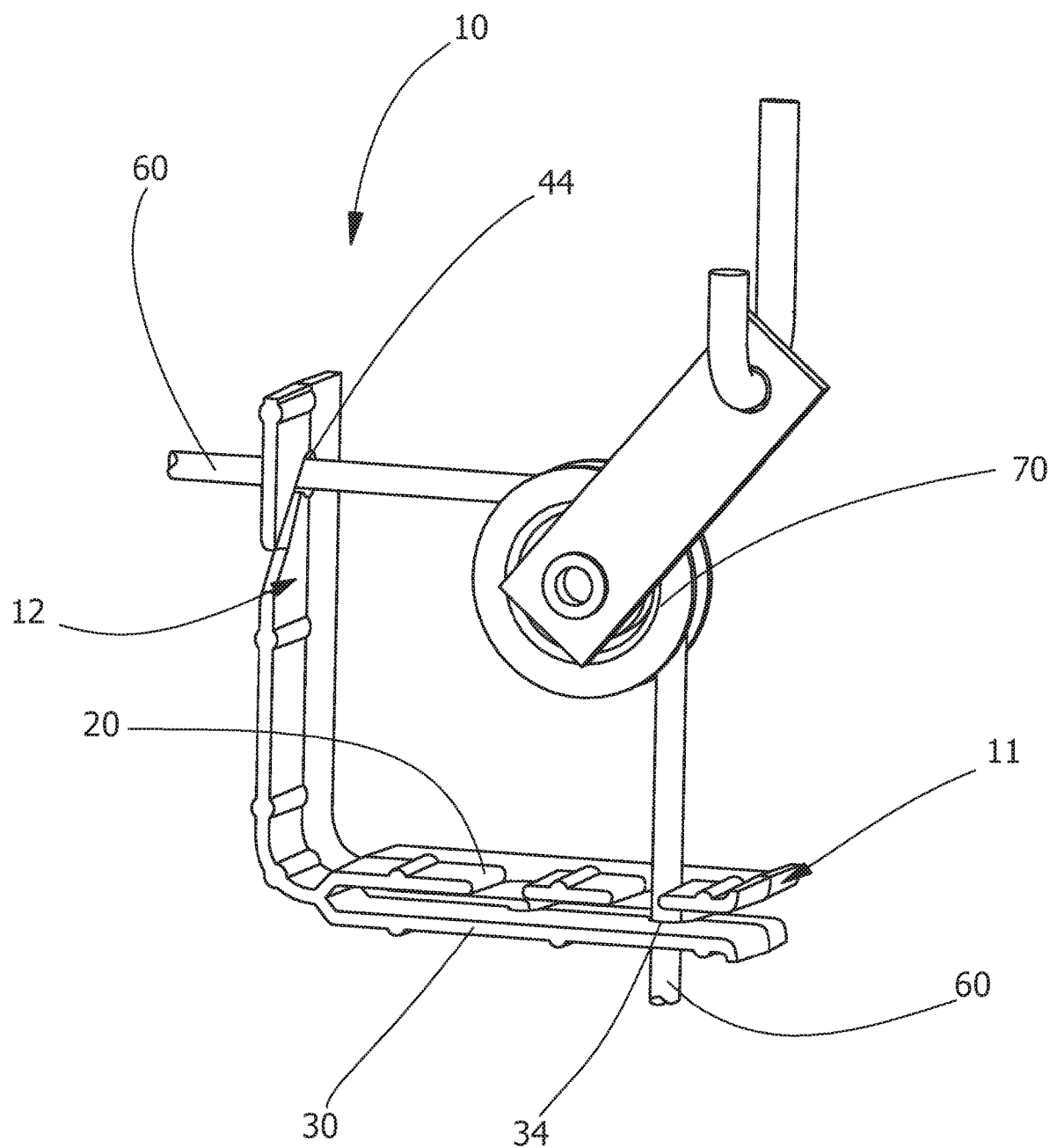
FIG. 12 is another environmental perspective view of the device of FIG. 1.
Figure 13:
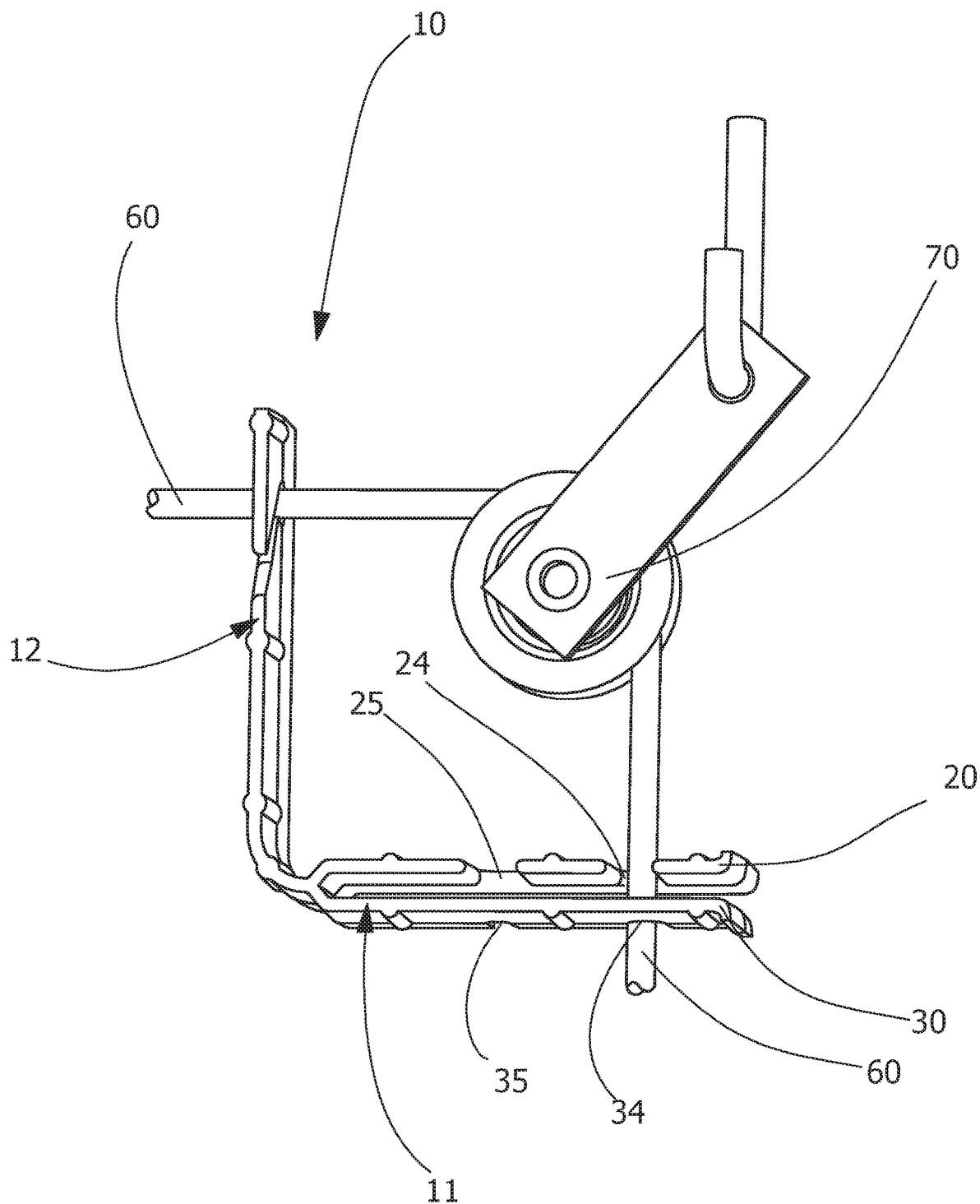
FIG. 13 is another environmental perspective view of the device of FIG. 1.
Figure 14:
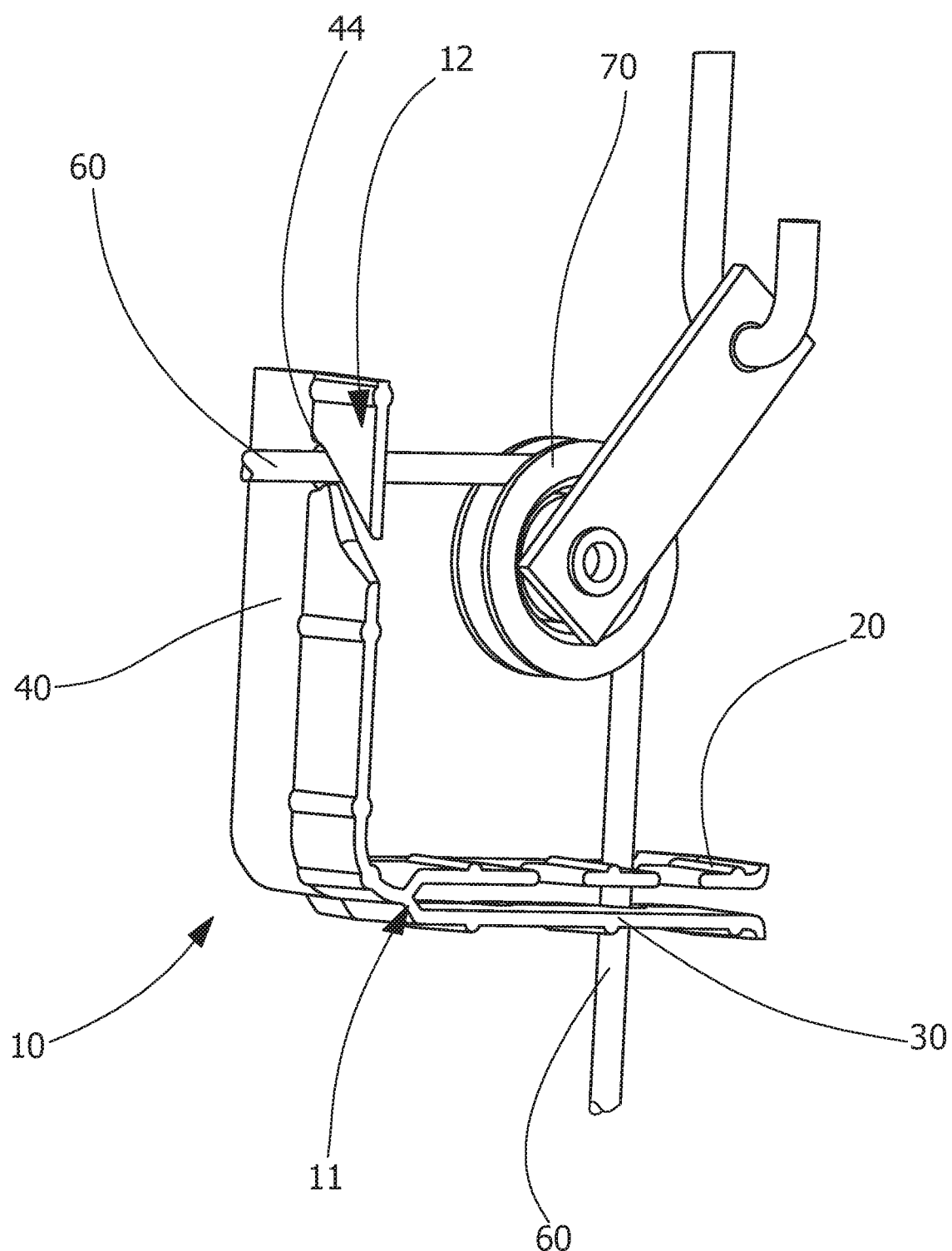
FIG. 14 is another environmental perspective view of the device of FIG. 1.

A portion of the line 60 that is substantially co-planar with the top of the pulley 70 is slid into the narrow channel portion of the opening 44 in the second section 12 until it rests within the circular section of the opening 44, as shown in FIGS. 11-13. As such, the device 10 is secured on the line 60.

Figure 15:
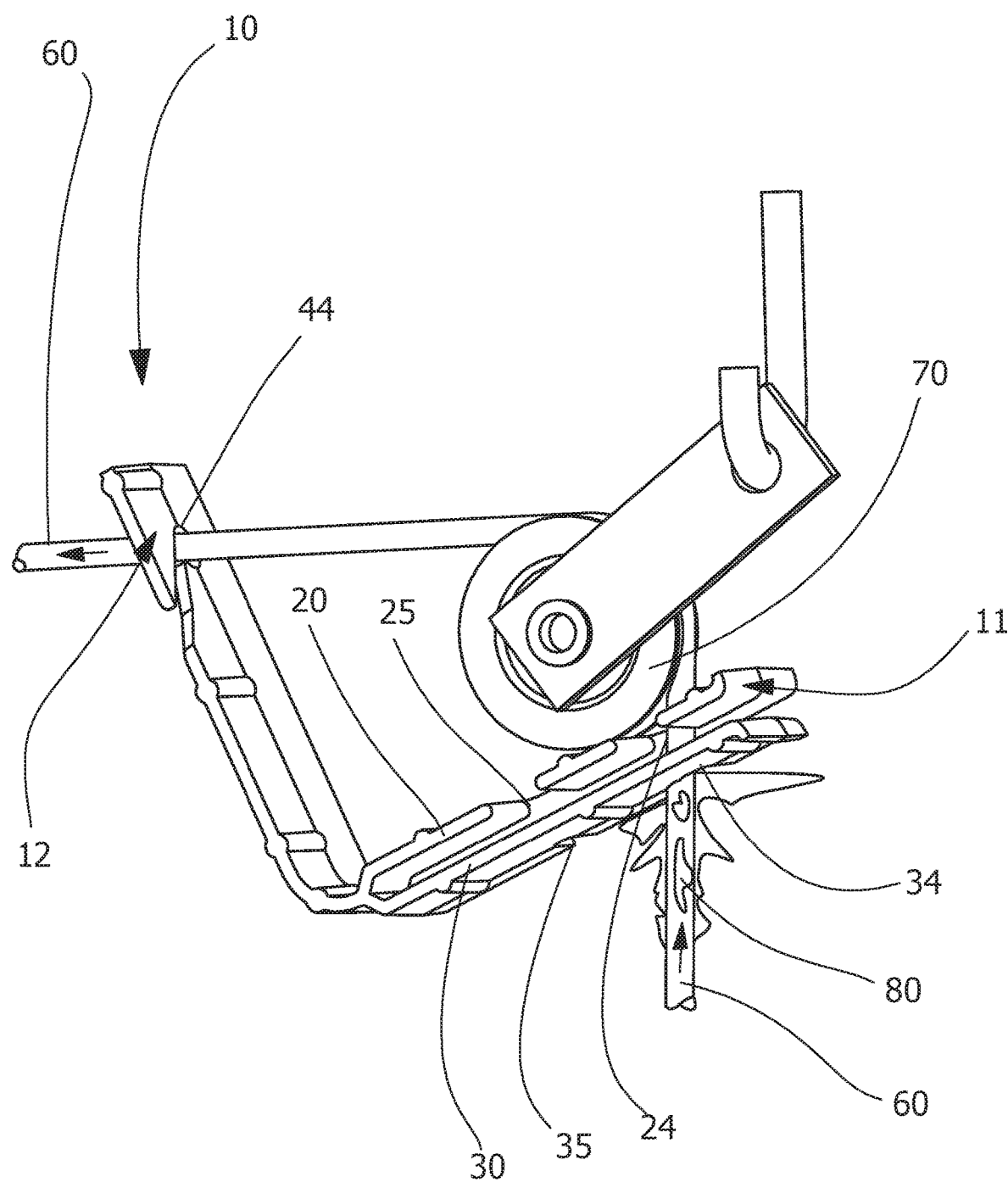
FIG. 15 is another environmental perspective view of the device of FIG. 1.

The first opening 24 of the inner panel 20 and the first opening 34 of the outer panel are both U-shaped and oriented in opposite directions to each other. The first opening 24 of the inner panel 20 and the first panel 34 of the outer panel 30 together form an enclosure through which the line 60 is positioned and frictionally engages the inner and outer panels 20, 30. When the line 60 is raised by the pulley 70, the first section 11 of the device 10 is pushed up against the pulley 70, as shown in FIG. 15, and scrapes off dirt, dust and other debris 80 from the line 60, preventing it from coming into contact with the pulley 70. The apparatus 10 prevents dirt, dust and other debris from accumulating in and on the pulley 70.

Figure 16:
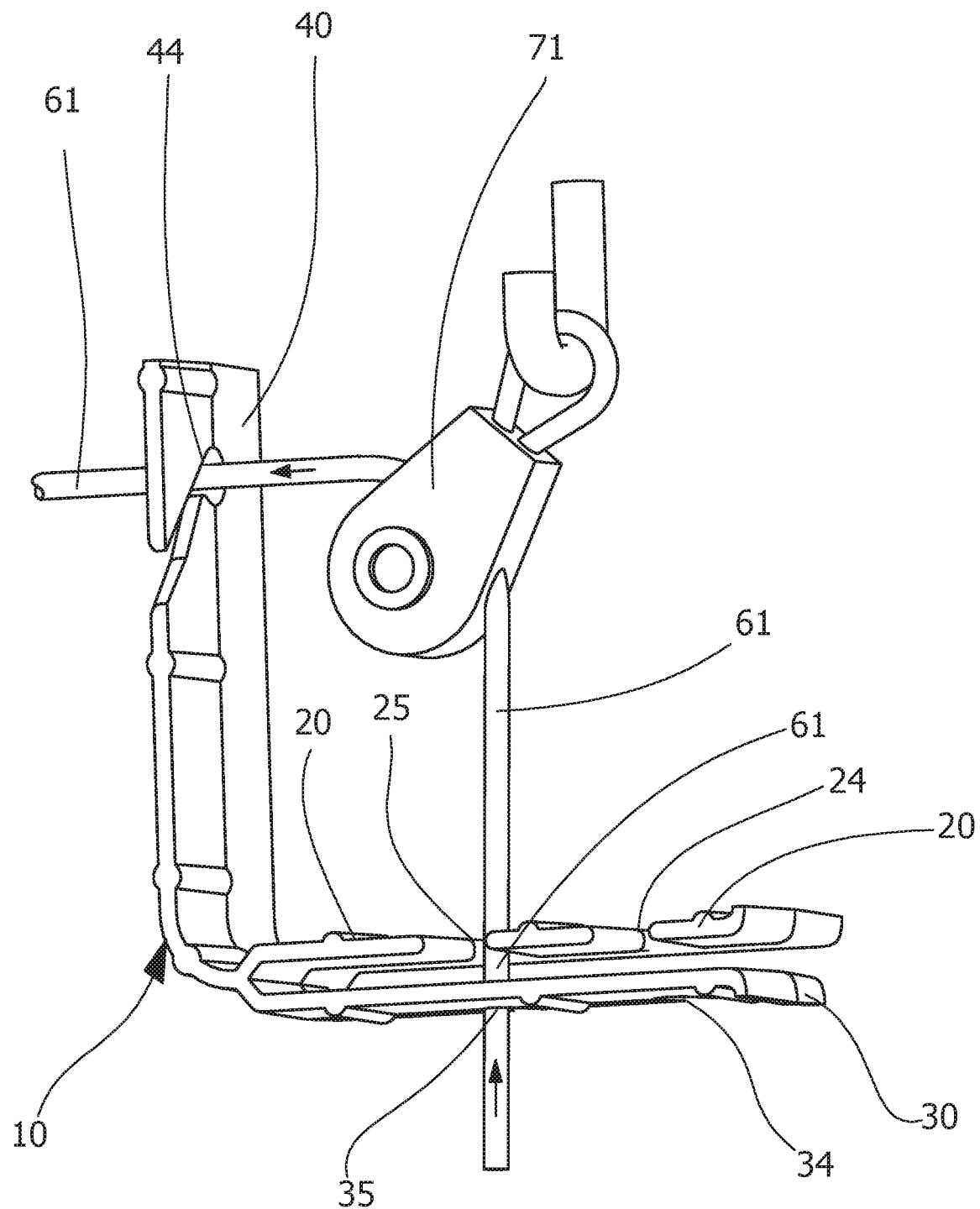
FIG. 16 is another environmental perspective view of the device of FIG. 1.
Figure 17:
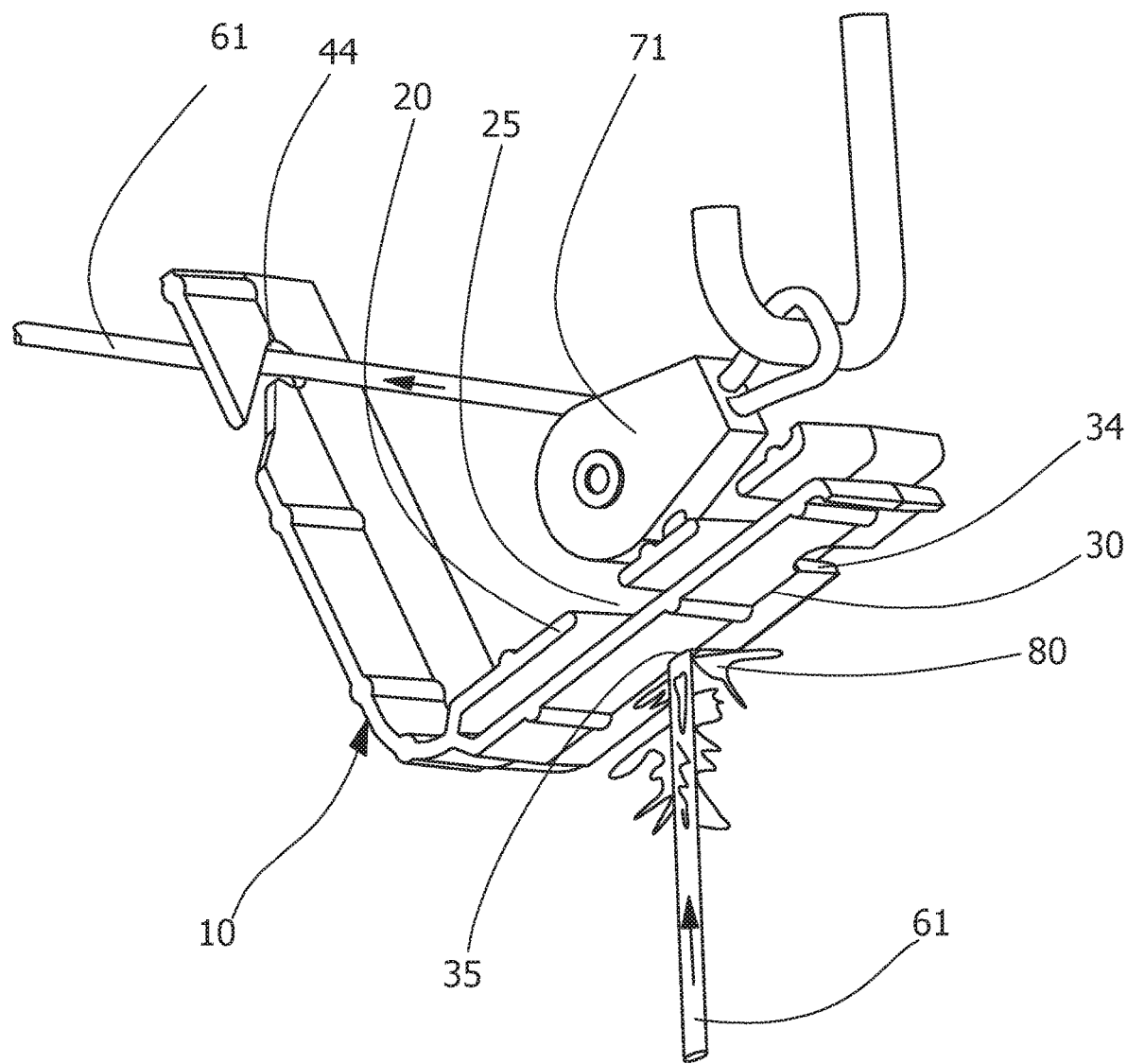
FIG. 17 is another environmental perspective view of the device of FIG. 1.

FIGS. 16 and 17 illustrate use of the device with a line 61, which has a smaller diameter than the previously described line 60. The line 61 can be a cord or cable having a diameter of about ⅛ inch. The user positions a portion of the line 61 that is below the pulley 71 within the second opening 25 of the inner panel 20 and the second opening 35 of the outer panel 30 of the first section 11, as shown in FIG. 16. A portion of the line 61 that is substantially co-planar with the top of the pulley 71 is slid into the narrow channel portion of the opening 44 in the second section 12 until it rests within the circular section of the opening 44, as shown in FIGS. 16 and 17. When the line 61 is raised by the pulley 71, the first section 11 of the device 10 is pushed up against the pulley 71, and scrapes off dirt, dust and other debris 80 from the line 61, preventing it from coming into contact with the pulley 71, as shown in FIG. 17.

Although the device 10 is described above as being used on a feeder/drinker cord or cable in a poultry house, the invention is not so limited. The device 10 can be used on a variety of cords, cables, lines, strings, wires, ropes, and the like. The device 10 is not limited to use in poultry houses and can be used to keep pulleys clean in a variety of environments.

Figure 18:
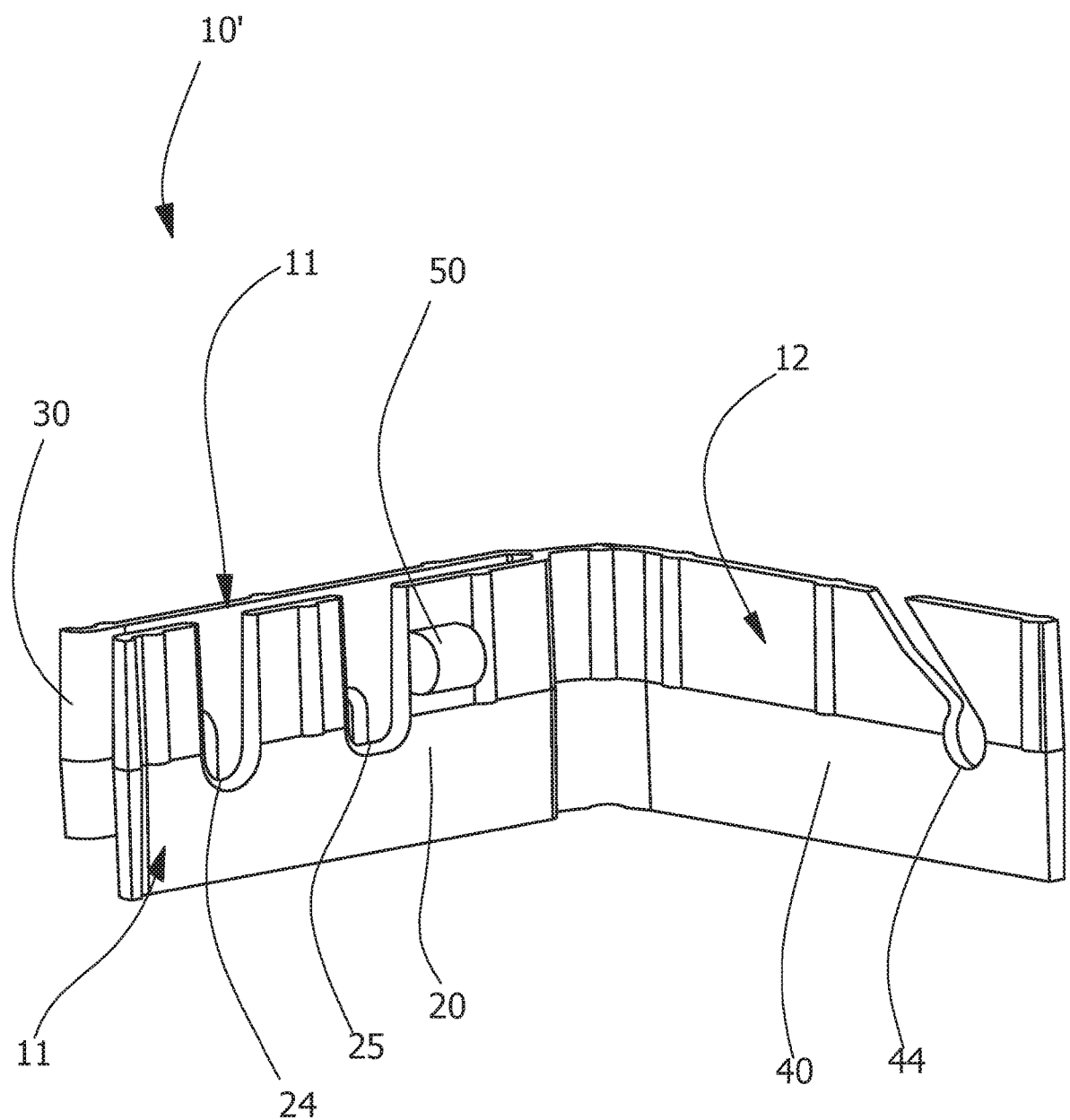
FIG. 18 is a perspective view of a cord cleaning device according to another preferred embodiment of the invention.

A cleaning device according to another preferred embodiment of the invention is illustrated in FIG. 18 and is shown generally at reference numeral 10'. The cleaning device 10' is identical in structure to the previously described embodiment 10, except that the cleaning device 10' comprises an arcuate bump 50 formed on the interior surface of the inner panel 20 of the first section 11. When the device 10' is positioned on a feeder/drinker cord or cable, the bump 50 can be positioned directly against the pulley and cleans the pulley.

A cord cleaning device and method of using same are described above. Various changes can be made to the invention without departing from its scope. The above description of various embodiments of the invention are provided for the purpose of illustration only and not limitation—the invention being defined by the claims and equivalents thereof.

What is claimed is:

1. An apparatus for cleaning a linear member comprising:
    (a) a first section connected to a second section, the first section angled in relation to the second section and comprising a first panel and a second panel, wherein the first panel defines a first edge and a second edge opposed to the first edge, and the second panel defines a first edge and a second edge opposed to the first edge, the first edge of the first panel proximate to the first edge of the second panel and the second edge of the first panel proximate to the second edge of the second panel; and
    (b) at least one opening formed in the first panel in communication with the first edge of the first panel, and at least one opening formed in the second panel in communication with the second edge of the second panel, the at least one opening in the first panel being at least partially aligned with the at least one opening in the second panel, the at least one opening of the first panel and the at least one opening of the second panel together forming an enclosure for receiving the linear member therethrough whereby the first panel and the second panel frictionally engaging the linear member.

2. The apparatus according to claim 1, wherein the second section defines a first edge and a second edge opposed to the first edge, the first edge of the second section being co-planar with the first edge of the first panel of the first section, and an opening adapted for receiving and retaining the linear member is formed in the second section and is in communication with the first edge of the second section.

3. The apparatus according to claim 2, wherein the opening formed in the second section comprises a channel portion extending at an angle from the first edge of the second section to a circular portion.

4. The apparatus according to claim 3, wherein the circular portion has a diameter that is greater than a width of the channel portion.

5. The apparatus according to claim 1, wherein the linear member comprises at least one selected from the group consisting of a cord, cable, line, string, wire, and rope.

6. The apparatus according to claim 1, wherein the first section is substantially perpendicular to the second section.

7. The apparatus according to claim 1, wherein the at least one opening in the first panel comprises a first panel first opening and a first panel second opening, and the at least one opening in the second panel comprises a second panel first opening and a second panel second opening, wherein the first panel first opening being at least partially aligned with the second panel first opening, and the first panel second opening being at least partially aligned with the second panel second opening.

8. The apparatus according to claim 7, wherein the second panel first opening has a width greater than a width of the second panel second opening.

9. An apparatus for cleaning a linear member operatively connected to a pulley comprising:
(a) a first section connected to a second section, the first section being substantially perpendicular to the second section and comprising a first panel and a second panel, wherein the first panel defines a first edge and a second edge opposed to the first edge, and the second panel defines a first edge and a second edge opposed to the first edge, the first edge of the first panel proximate to the first edge of the second panel and the second edge of the first panel proximate to the second edge of the second panel;
(b) at least one opening formed in the first panel in communication with the first edge of the first panel, and at least one opening formed in the second panel in communication with the second edge of the second panel, the at least one opening in the first panel being at least partially aligned with the at least one opening in the second panel, the at least one opening of the first panel and the at least one opening of the second panel together forming an enclosure for receiving the linear member therethrough whereby the first panel and the second panel frictionally engage the linear member; and
(c) wherein the second section defines a first edge and a second edge opposed to the first edge, the first edge of the second section being co-planar with the first edge of the first panel of the first section, and an opening adapted for receiving and retaining the linear member is formed in the second section and is in communication with the first edge of the second section.

10. The apparatus according to claim 9, wherein the opening formed in the second section comprises a channel portion extending at an angle from the first edge of the second section to a circular portion.

11. The apparatus according to claim 10, wherein the circular portion has a diameter that is greater than a width of the channel portion.

12. The apparatus according to claim 9, wherein the linear member comprises at least one selected from the group consisting of a cord, cable, line, string, wire, and rope.

13. The apparatus according to claim 9, wherein the at least one opening in the first panel comprises a first panel first opening and a first panel second opening, and the at least one opening in the second panel comprises a second panel first opening and a second panel second opening, wherein the first panel first opening being at least partially aligned with the second panel first opening, and the first panel second opening being at least partially aligned with the second panel second opening.

14. The apparatus according to claim 13, wherein the second panel first opening has a width greater than a width of the second panel second opening.

15. The apparatus according to claim 14, wherein the second panel first opening has a width of ¼ inch and the second panel second opening has a width of 3/16 inch.

16. A method of cleaning a linear member operatively connected to a pulley comprising: (a) providing an apparatus comprising: (i) a first section connected to a second section, the first section being substantially perpendicular to the second section and comprising a first panel and a second panel, wherein the first panel defines a first edge and a second edge opposed to the first edge, and the second panel defines a first edge and a second edge opposed to the first edge, the first edge of the first panel proximate to the first edge of the second panel and the second edge of the first panel proximate to the second edge of the second panel, (ii) at least one opening formed in the first panel in communication with the first edge of the first panel, and at least one opening formed in the second panel in communication with the second edge of the second panel, the at least one opening in the first panel being at least partially aligned with the at least one opening in the second panel, the at least one opening of the first panel and the at least one opening of the second panel together forming an enclosure for receiving the linear member therethrough, and (iii) wherein the second section defines a first edge and a second edge opposed to the first edge, the first edge of the second section being co-planar with the first edge of the first panel of the first section, and an opening adapted for receiving and retaining the linear member is formed in the second section and is in communication with the first edge of the second section; (b) positioning a first portion of the linear member that is prior to entering the pulley within the enclosure formed by the at least opening in the first panel and the at least one opening in the second panel; (c) positioning a second portion of the linear member that has exited the pulley within the opening formed in the second section; and (d) moving the linear member through the pulley, whereby debris on the linear member is scrapped off of the linear member by the first panel and the second panel of the first section.

17. The apparatus according to claim 16, wherein the opening formed in the second section comprises a channel portion extending at an angle from the first edge of the second section to a circular portion, and the circular portion has a diameter that is greater than a width of the channel portion.

18. The apparatus according to claim 16, wherein the linear member comprises at least one selected from the group consisting of a cord, cable, line, string, wire, and rope.

19. The apparatus according to claim 16, wherein the at least one opening in the first panel comprises a first panel first opening and a first panel second opening, and the at least one opening in the second panel comprises a second panel first opening and a second panel second opening, wherein the first panel first opening being at least partially aligned with the second panel first opening, and the first panel second opening being at least partially aligned with the second panel second opening.

20. The apparatus according to claim 19, wherein the second panel first opening has a width greater than a width of the second panel second opening.

\* \* \* \* \*